June 5, 1951   R. L. ROSENTHAL ET AL   2,555,937
METHOD AND APPARATUS FOR MEASURING RESISTANCE
OF BLOOD DURING CLOTTING
Filed Aug. 25, 1949

INVENTOR.
Robert L. Rosenthal
Charles W. Tobias
BY
Attorney

Patented June 5, 1951

2,555,937

UNITED STATES PATENT OFFICE 2,555,937

METHOD AND APPARATUS FOR MEASURING RESISTANCE OF BLOOD DURING CLOTTING

Robert L. Rosenthal, San Francisco, and Charles W. Tobias, Berkeley, Calif.

Application August 25, 1949, Serial No. 112,218

3 Claims. (Cl. 175—183)

This invention relates to a method and apparatus for measuring the electrical resistance of fluids more particularly blood during clotting and clot retraction. Prior art investigators have reported that no consistent variation of the electrical resistance of blood during clotting can be measured. See, for example, R. T. Frank, A Note on the Electric Conductivity of Blood During Coagulation, American Journal of Physiology 14:466, 1905 and P. Ott, Changes in Fixed Electric Resistance of Human Blood During Coagulation; Klin. Wchnschr. 10:1406, 1931. By the use of the present invention it has been found possible to measure a substantially continous variation in the resistance of blood during clotting and retraction, which measurement is predictable and reproducible.

Objects of the present invention are therefore to provide a method and apparatus for measuring the electric resistance of fluids, especially human blood during the clotting, of such a character that reproducible results are obtainable.

Although the invention is useful for measuring the resistance of various electrolytes including colloids and especially fluids subject to syneresis, it is particularly applicable to measurements on blood. Therefore, although it is to be understood that the terms "fluid" or "electrolyte" apply throughout the specification, the invention will be described using the term "blood."

In order to insure usable results it has been found necessary that the method and apparatus used be such that a measurement is made of the resistance between electrodes so dimensioned and disposed that, when normal blood is used, they lie during the entire time over which measurements are made, wholly within a clot so arranged that it is capable of substantially free or unimpeded retraction.

To accomplish these things regard must be had to certain conditions:

1. The size, shape and material of the container;
2. The size, shape and position relative to the container and sample of blood of the electrodes;
3. The type of electrical measuring instrument used to measure the resistance between the electrodes.

The terms "clot retraction" and "retracted clot" must be understood as distinguished from merely "clotting" or "clot." The two phenomena are separate and distinct and a description of them can be found in standard texts on physiology and the like such as "Textbook of Anatomy and Physiology" by Kimber, Gray and Stackpole, 11th Edition, published by MacMillan, page 295 and following and "The Hemorrhagic Diseases," by A. J. Quick, published in 1942 by Charles C. Thomas, Springfield, Illinois. Briefly, the nature of these actions is believed to be as follows. Essentially blood is made up of more or less solid material, primarily red cells, and liquid material which latter can be separated out as serum. Initially, freshly shed normal human blood placed, for example, in a glass test tube converts itself from a liquid to a jelly-like substantially homogeneous body. This process is generally known as "clotting." If the proper type of container is used, thereafter the solid material retracts from the walls of the container and coalesces in the central part thereof expressing the liquid "serum" as it continues to contract. Thus, after a period of time the contracted clot appears as a more or less solid mass floating in the middle of the straw-colored serum. This second process constituting a withdrawal of the clot from the walls of the container and a contraction of it into a compact mass with the expression of liquid is called "clot retraction."

The type of container required to produce a satisfactory retracted clot of normal blood is known to those skilled in this art. The following publications illustrate the formation of retracted clots: the aforementioned Textbook of Anatomy and Physiology; "Blood Clot Retraction," an article by Lucia et al., vol. 204, No. 4, pages 507–516, October 1942 of the American Journal of the Medical Sciences showing clot retraction around a hooked wire inserted in a centrifuge tube, and an article by the present inventors entitled "Measurement of the Electrical Resistance of Human Blood," published in volume 33, No. 9, pages 1110–1122, September 1948, Journal of Laboratory and Clinical Medicine. The latter publication describes the present invention in some detail. The material of which the container is made can be anything that is convenient provided that it does not have such an affinity for fibrin that it will prevent retraction of the clot from its walls. Glass is the most obvious material and is quite satisfactory. Collodion has been found to be unsatisfactory and paraffin probably also unsatisfactory. A mere trial with normal blood in a proper size container of any chosen material will easily demonstrate whether that material is satisfactory.

Containers of different shapes can be used but care should be taken that the volume of blood used is sufficient to produce a column at least as high or preferably higher than it is wide. That is, for example, if the container to be used is a beaker it would be expected that no satisfactory clot would be formed if so little blood were used as merely to cover the bottom of the beaker with a thin layer. An adequate retracted clot will form in such a variety of containers as beakers, flasks, test tubes and centrifuge tubes. As a practical matter, however, test tubes, or the like, are preferable since they require the least amount of blood and are convenient to handle.

The absolute size of the tube or container should be such that the volume of blood required to produce in it an adequately retracted clot will not be so large that the retracted clot falls down in such a way that it no longer wholly surrounds or adequately adheres to the electrodes.

The prior art in the field of electrochemical measurements suggests in a general way the shape of and the material for the electrodes as well as limitations on their minimum size and spacing necessary to avoid inaccuracies due to polarization, poor contact with the electrolyte, etc. For example, pin points or small wire electrodes would be inadvisable. Materials which would react with the blood are to be avoided. These general prior art teachings however are insufficient to permit of accomplishing the objects of this invention. The present invention comprehends the notions that the electrodes must be so shaped and arranged that they do not impede retraction of the clot; that the material of which the electrodes is made should be such as to insure good contact with the blood clot; that the maximum size and maximum spacing between electrodes must be such that an adequate retracted clot can be formed of sufficient size to wholly envelope the electrodes during the entire clot retraction process but that the size of such a clot is not so large that its weight is sufficient to drag it away from the electrodes by overcoming the adhesion of the clot to the particular material of which the electrodes are made; that the maximum size and spacing of electrodes must also be such that there is good contact of the blood along the entire electrode surface. If the electrodes are imbedded in a wall of the container or spaced too close to a wall of the container clot retraction may be impeded, and/or the electrodes will very likely not remain fully enclosed by the clot during its retraction.

It is known to those skilled in the art that during retraction of a clot appreciable forces are exerted by the retraction and therefore it is obvious that the strength of the electrodes and their supporting structure must be such that they are not distorted materially by the clot retraction. To insure that clot retraction is not impeded, the electrode structure should be such that a comparatively large region of clear space is left unoccupied by structural elements where the central portion will be of the clot that is expected to form.

Any convenient method can be used for measuring the resistance across the electrodes but of course the method chosen should be such as to avoid any extraneous disturbances of the clotting process such as electrolysis, polarization, heating, etc. Thus, it is desirable, as has been suggested in the prior art, to use either a null method or an alternating current of as low a magnitude as possible to pass through the clot.

The method, then, of the present invention involves essentially placing a sample of freshly shed blood in a container, such as a test tube, in which it is known that a good retracted clot would form with normal blood; placing a pair of properly sized electrodes generally near the central axis of the tube so that the clot will retract around the electrodes and completely enclose them during the clot retraction; and measuring the resistance across the electrodes during clotting and clot retraction. Experience has taught those skilled in the art the approximate size and location of a clot which will form with normal blood in any particular chosen container, and therefore, if such persons realize that it is essential to have the clot completely enclose the electrodes then the proper sizes of electrodes would be apparent to them. In any event, an estimate of the clot size can be made by referring to the known percentage composition of blood as between serum and solid material.

For a description of a specific preferred embodiment of the apparatus of the present invention reference is made to the accompanying drawing wherein.

Figure 1:
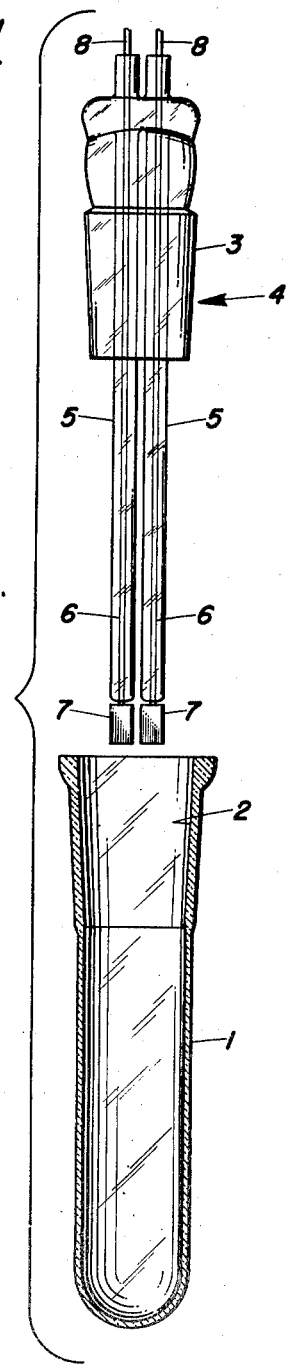
Fig. 1 shows an enlarged, exploded view, partially in cross section, of an electrode arrangement with its container.

Numeral 1 indicates a tube, conveniently made of glass, generally in the form of a test tube having a ground seat 2 to receive snugly the ground glass stopper 3 constituting a part of the support for the electrode assembly 4. This arrangement serves to maintain the electrodes in fixed relation to the container when the cell is assembled. Fused to the stopper 3 are a pair of small glass tubes 5 each having fused into it a wire 6. Each wire terminates at one end in a square electrode 7 of platinum which is welded or otherwise attached to the wire for good electrical conduction. The other end of each wire 6 terminates in a lead 8 for connection to the ohmmeter circuit. The electrodes are preferably platinized in a known manner described in the aforementioned publication of the present inventors. Of course, other shapes i. e. circular, polygonal, etc. of electrodes can be used provided they satisfy the aforedescribed criteria. In a typical construction according to the preferred embodiment the electrodes were made of lightly platinized platinum plates about .01 inch in thickness, about ½ centimeter square, and about ½ centimeter apart. The corresponding tube was about 12 millimeters in inside diameter. The electrodes were suspennded so that their lower edges were approximately 7 millimeters from the bottom of the tube.

Figure 2:
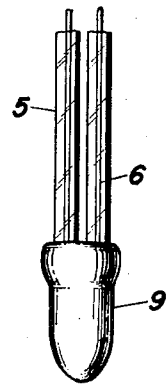
Fig. 2 shows a retracted blood clot adhering to and enclosing the electrodes of Fig. 1.

As shown in Fig. 2, normal blood forms a retracted clot 9 fully enclosing and adhering to the electrodes so that the electrodes can be removed from the tube taking the clot, undisturbed, with them and leaving merely the serum in the tube. It should be noted that no part of the electrodes protrudes outside the clot.

Figure 3:
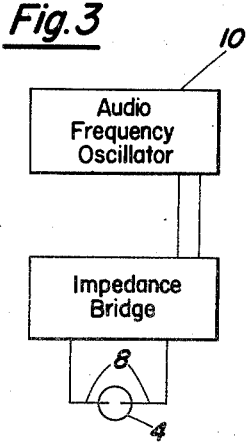
Fig. 3 is a diagrammatic representation of the ohmmeter circuit used to measure the resistance across the electrodes.

A typical ohmmeter (Fig. 3) for use with the preferred embodiment of the invention comprises an audio frequency oscillator 10 and an impedance bridge 11. Negligible variation of the measurements with frequency was found and a thousand cycles A. C. proved convenient with an applied voltage of .25 volt R. M. S. Although the bridge method gives satisfactory results, a more convenient apparatus can be used which is constituted essentially of means for passing a very low magnitude audio frequency current of substantially constant value (about 1 milliamp.) through the electrode circuit and measuring the voltage drop across the electrodes with an instrument having its scale calibrated to read in ohms or ohm-centimeters (specific resistance). When using a resistivity (specific resistance) scale the instrument is calibrated against a standard solution used in the same test tube in place of the blood.

*Operation*

In practicing the present invention a sample of freshly shed blood is placed in the tube which has been previously thoroughly cleaned. In the aforedescribed typical example of a preferred embodiment about 1.5 cc. of blood is sufficient. The electrode structure 4, also thoroughly cleaned, is inserted in the tube 1 and the entire cell is preferably placed in a rack where it will remain undisturbed. The leads 8 are connected into the ohmmeter circuit and measurements are taken continuously or at any desired periods during clotting and clot retraction of the blood. It has been found that even in cases where the fluid used is blood so altered that it will not form a clot that retracts in a manner visible to the naked eye, nevertheless consistent and reproducible measurements of variation of resistance with clotting are obtainable with the practice of the present invention.

What is claimed is:

1. A method for measuring the resistance of blood during clotting comprising, the steps of (1) placing in a container, of the type in which normal blood will form an adequate retracted clot, sufficient blood to form an adequate retracted clot; (2) inserting a pair of spaced electrodes into the blood in a position to be immersed in the clot which will form, said electrodes being of such size and spacing that they will remain completely enclosed by the clot throughout its retraction; and (3) measuring the resistance across the electrodes.

2. An apparatus for measuring the resistance of blood during clotting comprising a container adapted to produce an adequate retracted clot, a pair of spaced electrodes of such size and spacing as to fit completely within said clot throughout its retraction, means for supporting said electrodes in said container in a position to be completely enclosed by said clot, and means for measuring the resistance across said electrodes.

3. In an apparatus for measuring the resistance of blood during clotting, a container adapted to produce an adequate retracted clot, a pair of spaced electrodes of such size and spacing as to fit completely within said clot throughout its retraction, and means for supporting said electrodes in said container in a position to be completely enclosed by said clot, said electrodes and container and supporting means being so constructed and arranged that said clot is substantially free for unimpeded retraction.

ROBERT L. ROSENTHAL.
CHARLES W. TOBIAS.

REFERENCES CITED

The following references are of record in the file of this patent:

UNITED STATES PATENTS

| Number | Name | Date |
|---|---|---|
| 1,592,979 | Keeler | July 20, 1926 |
| 1,860,397 | Slawinski | May 31, 1932 |